(12) United States Patent
Aoyagi et al.

(10) Patent No.: US 6,687,368 B1
(45) Date of Patent: Feb. 3, 2004

(54) TONE SIGNAL DETECTING METHOD AND TONE SIGNAL DETECTOR

(75) Inventors: Hiromi Aoyagi, Tokyo (JP); Atsushi Shimbo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/527,445

(22) Filed: Mar. 17, 2000

(30) Foreign Application Priority Data

Apr. 1, 1999 (JP) .......................................... 11-095242

(51) Int. Cl.[7] .............................. H04M 3/00; H04J 3/12; H04L 27/14; H04Q 1/45
(52) U.S. Cl. ...................... 379/283; 370/526; 375/316; 379/386
(58) Field of Search .................... 370/526; 375/316; 379/93.26, 282, 283, 339, 386, 390.02

(56) References Cited

U.S. PATENT DOCUMENTS

| | | | | |
|---|---|---|---|---|
| 4,893,316 A | * | 1/1990 | Janc et al. .................. | 708/300 |
| 5,392,348 A | * | 2/1995 | Park et al. .................. | 379/386 |
| 5,420,888 A | * | 5/1995 | Davis et al. ................. | 375/334 |
| 5,734,577 A | * | 3/1998 | Chesir et al. ................ | 342/159 |
| 5,995,557 A | * | 11/1999 | Srinivasan .................. | 375/316 |
| 6,226,303 B1 | * | 5/2001 | Levens et al. .............. | 370/526 |
| 6,597,748 B1 | * | 7/2003 | Hietala et al. .............. | 375/324 |

* cited by examiner

*Primary Examiner*—Harry S. Hong
(74) *Attorney, Agent, or Firm*—Venable LLP; Michael A. Sartori; John H. Kim

(57) ABSTRACT

A method for detecting a tone signal includes determining a correlative value of an input signal obtained for each frame of a predetermined length, determining an estimating expression that represents an output power of a second order FIR band elimination filter that uses the correlative value of the input signal as an input and a frequency thereof as a parameter, determining a frequency at which a minimum value of the estimating expression is obtained, determining a prediction gain of the FIR band elimination filter at the determined frequency, and determining that the input signal is a tone signal if a value of the determined prediction gain exceeds a preset threshold value.

10 Claims, 2 Drawing Sheets

TONE SIGNAL DETECTING METHOD AND TONE SIGNAL DETECTOR

BACKGROUND OF THE INVENTION

1. Field of the Invention

The present invention relates to a method and an apparatus for detecting tone signals such as DTMF signals.

2. Description of the Related Art

In a voice communication using, for example, a fixed telephone or a portable telephone, a variety of services that utilize tone signals such as DTMF signals are available. Such services include, for example, reservations of tickets and messages in answering machines. For these services that require accurate detection of tone signals, methods such as a Fourier transformation and a filter bank using band-pass filter have been proposed.

The foregoing detecting methods, however, have been posing problems in that they require a huge volume of operation, or no satisfactory frequency resolution or time resolution can be obtained.

SUMMARY OF THE INVENTION

The present invention has been made with a view toward solving the problems described above, and an object thereof is to provide a method for detecting tone signals that permits high frequency resolution and high time resolution to be obtained by using a simple configuration.

To this end, according to the present invention, there is provided a method for detecting a tone signal, wherein a correlative value of an input signal obtained for each frame of a predetermined length is determined, an estimating expression is obtained that expresses an output power of a second order FIR band elimination filter that uses the correlative value of the input signal as an input and a frequency thereof as a parameter, a frequency at which a minimum value of the estimating expression is obtained is determined, an estimated gain of the FIR band elimination filter at the determined frequency is determined, and it is determined that the input signal is a tone signal if a value of the determined estimated gain exceeds a preset threshold value.

DESCRIPTION OF THE PREFERRED EMBODIMENTS

First Embodiment

First, an outline of a configuration of a tone signal detector of a first embodiment in accordance with the present invention will be described.

Figure 1:
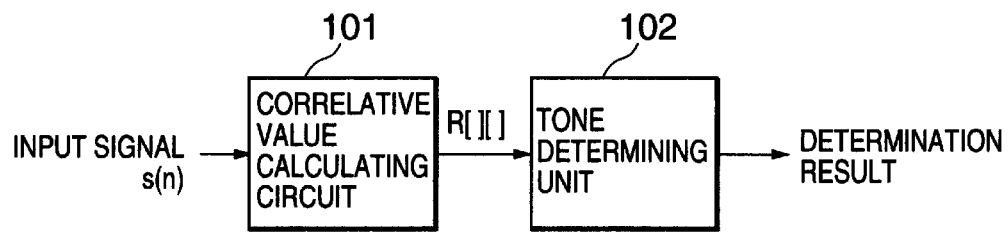
FIG. 1 is a diagram showing a configuration of a tone signal detector in accordance with a first embodiment.

FIG. 1 shows a configuration of the tone signal detector of the first embodiment. The tone signal detector is comprised of a correlative value calculating circuit 101 for determining a correlative value of an input signal obtained for every frame of a predetermined length, and a tone determining unit 102, that are connected in this order.

More detailedly, the tone determining unit 102 has an output power calculating section that determines an estimating expression representing an output power of a second order FIR band elimination filter that uses a correlative value of an input signal as an input and a frequency thereof as a parameter, a minimum frequency calculating section that determines a frequency at which a minimum value of the estimating expression can be obtained, a prediction gain calculating section that determines a prediction gain of the FIR band elimination filter at the frequency determined by the minimum frequency calculating section, and a prediction gain comparing section that compares a value of the prediction gain determined by the prediction gain calculating section with a preset threshold value, and the tone determining unit 102 determines that an input signal is a tone signal if the estimated gain exceeds the threshold value.

In the embodiment, the components mentioned above refer to functional blocks to be used in a procedure of signal processing. The correlative value calculating circuit 101 and the tone determining unit 102 are composed of DSPs that have memories where processing procedures and data are stored, multipliers, adders, etc.

An operation of the tone signal detector will be described in more detail.

The correlative value calculating circuit 101 calculates a correlative value $R[i][j]$ based on an input signal $s(n)$ received as a vector for each N samples as shown below.

$$R[i][j] = \sum_{n=2}^{N-1} s(n-i)s(n-j) \text{ where } i = 0 \sim 2, j = 0 \sim 2$$

The tone determining unit 102 operates as follows.

In the second order FIR filter expressed as $$A(z)=1-a_1 z^{-1}-a_2 z^{-2} \qquad (1),$$

a band elimination filter is obtained when a coefficient at which $A(z)$ becomes zero at a certain frequency $f_1[Hz]$ is determined.

If it is defined as shown below;

$$b=a_1/2$$

$$c=-a_2$$

then, expression (1) will be:

$$A(z)=1-2bz^{-1}+cz^{-2} \qquad (2)$$

In order for expression (2) to give 0 at $f_1$, $$1-2bz_1^{-1}+cz_1^{-2}=0 \qquad (3)$$

$$\text{where } z_1=\cos 2\pi f_1 - j \sin 2\pi f_1 \qquad (4)$$

Further, expression (3) is transformed as follows:

$$z_1^2 - bz_1 + c = 0$$

$$\text{therefore, } z_1 = b \pm \sqrt{(b^2-c)} \qquad (5)$$

Based on expressions (4) and (5), $$\cos 2\pi f_1 - j \sin 2\pi f_1 = b \pm \sqrt{(b^2-c)} \qquad (6)$$

Comparing the coefficients provides the following ("+" of "±" in the right side of expression (6) is a mirror image)

$$b = \cos 2\pi f_1 \quad (7)$$

$$b^2 - c = -\sin^2 2\pi f_1 \quad (8)$$

Substituting expression (7) into expression (8) gives:

$$\cos^2 2\pi f_1 - c = -\sin^2 2\pi f_1$$

$$c = \cos^2 2\pi f_1 + \sin^2 2\pi f_1$$

$$= 1$$

and the following will be obtained:

$$a_1 = 2\cos 2\pi f_1$$

$$a_2 = -1 \quad (9)$$

An output signal power of the filter in expression (1) can be represented by expression (10).

$$\sum_{n=2}^{N-1} e(n)^2 = \sum_{n=2}^{N-1} \{s(n) - a_1 s(n-1) - a_2 s(n-2)\}^2 \quad (10)$$

where e(n) denotes an output signal. Substituting expression (9) into expression (10) provides expression (11):

$$\sum_{n=2}^{N-1} e(n)^2 = \quad (11)$$

$$(R[0][0] + R[2][2] + 2R[0][2]) - 2(R[0][1] + R[1][2])\alpha + R[1][1]\alpha^2$$

where $\alpha = 2\cos 2\pi f_1$

If the input signal is a tone signal of frequency $f_1$, then a value of expression (11) will be a minimum value. If expression (11) is taken as a quadratic equation of α, then α that gives the minimum value is obtained as shown below by setting so that a result of carrying out differentiation of expression (11) using α is zero:

$$\alpha = 2\cos 2\pi f_1 = (R[0][1] + R[1][2])/R[1][1] \quad (12)$$

Based on expression (12), frequency $f_1$ can be determined by performing inverse cosine transformation.

Frequency $f_1$, thus determined minimizes a value of expression (11), i.e., the output signal power. A prediction gain of a filter at this time varies according to a characteristic of an input signal, the prediction gain of the filter being represented as follows:

$$10\log\left(\sum_{i=2}^{N-1} s(n)^2 \Big/ \sum_{i=2}^{N-1} e(n)^2\right) \quad (13)$$

Figure 2:
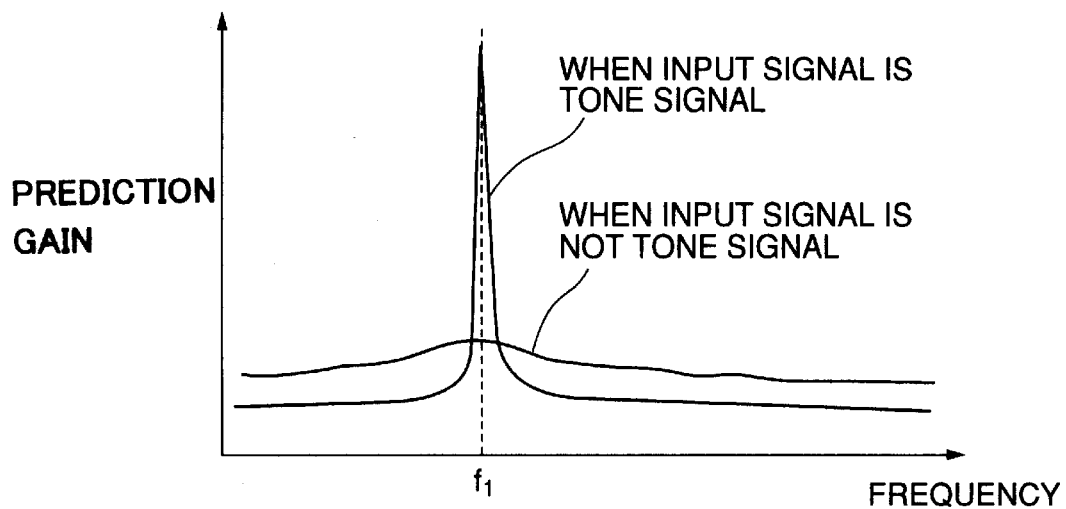
FIG. 2 is a diagram showing a relationship between characteristics of input signals and estimated gains in the tone signal detector in accordance with the first embodiment.

FIG. 2 shows values of expression (13) obtained at different values of α in expression (11), i.e., values of $f_1$. As is obvious from FIG. 2, if an input signal is a tone signal, then a prediction gain suddenly increases in the vicinity of frequency $f_1$. If an input signal is not a tone signal and contains diverse frequency components, then prediction gains change less at all frequencies.

First, frequency $f_1$ for minimizing a filter output signal power is determined by expression (12), then a prediction gain at frequency $f_1$ is determined by expression (13). If the determined prediction gain exceeds a preset threshold value, then it is determined that the input signal is a tone signal, and outputs the frequency $f_1$ at the same time. If the determined prediction gain does not exceed the preset threshold value, then it is determined that the input signal is not a tone signal, and −1 is output.

The configuration described above makes it possible to determine the presence of tonality or a frequency at which an input signal is a tone signal by carrying out simple calculations based on a correlative value of the input signal. For example, setting the value of N in the foregoing expressions to 40, which corresponds to 5 ms in 8-kHz sampling, allows a tone signal detector to be achieved that features high frequency resolution and high time resolution, has a simple configuration, and a smaller volume of operation.

Second Embodiment

Figure 3:
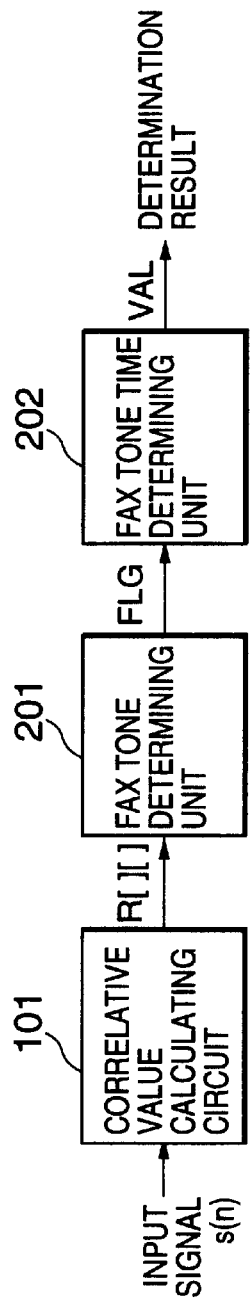
FIG. 3 is a diagram showing a configuration of a facsimile answer tone signal detector in accordance with a second embodiment.

FIG. 3 shows a configuration of a facsimile answer tone signal detector of a second embodiment in accordance with the present invention.

The facsimile answer tone signal detector of FIG. 3 is constituted by a correlative value calculating circuit 101, a facsimile tone determining unit 201, and a facsimile tone time determining unit 202, which are connected in this order. The correlative value calculating circuit 101 operates in a similar manner as the correlative value calculating circuit 101 of the first embodiment; hence, details of the operation thereof will not be repeated.

The facsimile tone determining unit 201 has an output power calculating section that determines an estimating expression representing an output power of a second order FIR band elimination filter that uses a correlative value of an input signal as an input and a frequency thereof as a parameter, a minimum cosine value calculating section that determines a cosine value of a frequency at which a minimum value of the estimating expression can be obtained, a frequency candidate determining section that compares a cosine value and a preset threshold value and determines that a frequency is a candidate frequency if the cosine value is within a range of the threshold value, and a power comparing section that compares an estimated value into which the determined cosine value has been substituted with an input signal power, and the facsimile tone determining unit 201 determines that an input signal is a tone signal candidate if a comparison result provided by the power comparing section indicates that the estimated value is below the input signal power and the frequency candidate determining section determines that the frequency is a frequency candidate.

The operation of the facsimile tone determining unit 201 will now be described, mainly focusing on different aspects from those of the tone determining unit 102 of the first embodiment.

The frequency of the facsimile answering tone is 2100 Hz. Frequencies within the following two frequency ranges will be detected, allowing some deviations.

$$f_2 = 2100 - \Delta Hz$$

$$f_3 = 2100 + \Delta Hz$$

where ΔHz is, for example, 20 Hz.

Furthermore, threshold values shown below will be prepared in advance, and a obtained by expression (12) will be directly compared with the threshold values.

$$\alpha_2 = 2\cos 2\pi f_2$$

$$\alpha_3 = 2\cos 2\pi f_3$$

If a value of a lies between the above two threshold values, and if a filter output power at that time satisfies $$\sum_{i=2}^{N-1} s(n)^2 > \sum_{i=2}^{N-1} e(n)^2 \times D, \quad (14)$$

then FLG=1 is output; if not, FLG=0 is output. D denotes a preset value and it is, for example, D=64.0.

The facsimile tone time determining unit 202 detects a facsimile answer tone based on FLG obtained for every N samples of input signals when FLG=1 lasts for a predetermined time or longer. More specifically, when FLG=1 is repeated for $M_1$ times or more, VAL=1 is output. After a facsimile answer tone has been detected once, if FLG=0 is repeated for $M_2$ times or more, VAL=0 is output. $M_1$ and $M_2$ are preset values, and they are, for example, $M_1$=100 and $M_2$=50.

This embodiment permits accurate detection of facsimile answer tones and requires a smaller volume of operation by using a simple configuration.

Third Embodiment

Figure 4:
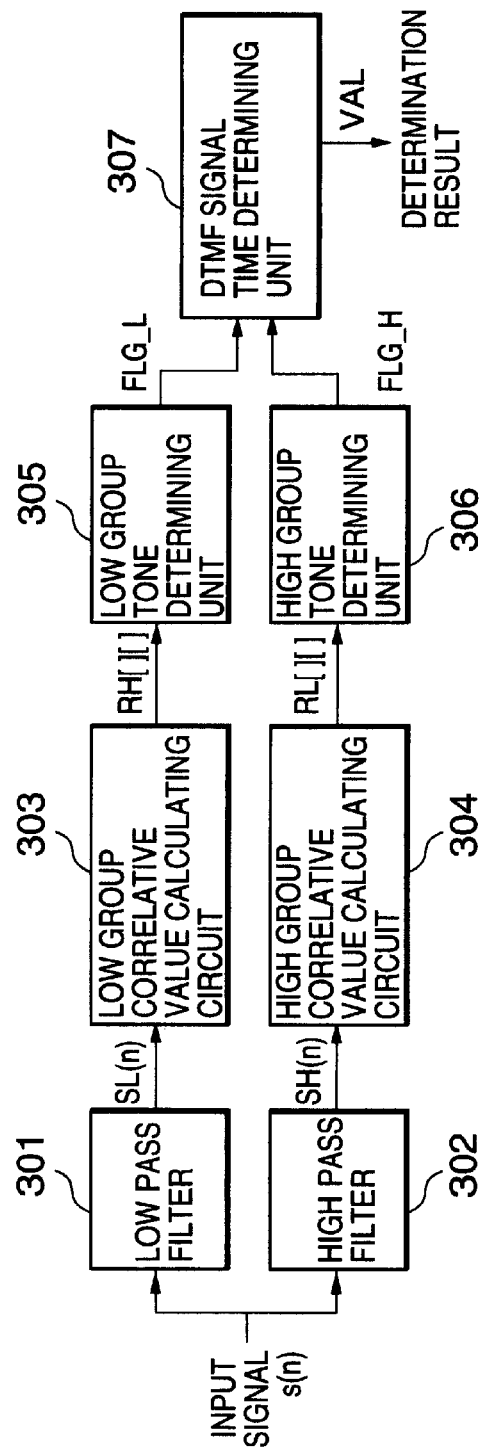
FIG. 4 is a diagram showing a configuration of a DTMF signal detector in accordance with a third embodiment.

FIG. 4 shows a configuration of a DTMF signal detector of a third embodiment in accordance with the present invention.

The DTMF signal detector of FIG. 4 is constructed by a low pass filter 301, a high pass filter 302, a low group correlative value calculating circuit 303, a high group correlative value calculating circuit 304, a low group tone determining unit 305, a high group tone determining unit 306, and a DTMF signal time determining unit 307.

The low pass filter 301 for obtaining low-band signals by removing high group frequencies from input signals received for every frame of a predetermined length, a low group correlative value calculating circuit 303 for determining low-band signal correlative values of low-band signals, and the low group tone determining unit 305 are connected in this order. Likewise, the high pass filter 302 for obtaining high-band signals by removing low group frequencies from input signals received for every frame of a predetermined length, a high group correlative value calculating circuit 304 for determining high-band signal correlative values of high-band signals, and the high group tone determining unit 306 are also connected in this order. These are all connected to the DTMF signal time determining unit 307.

The low group tone determining unit 305 has a low-band output power calculating section that determines a low-band estimating expression representing an output power of a second order FIR band elimination filter when a low-band signal is used as an input and a frequency thereof is used as a parameter, a low-band minimum cosine value calculating section that determines a low-band cosine value of a low-band frequency at which a minimum value of the low-band estimating expression can be obtained, a low-band frequency candidate determining section that compares a low-band cosine value with a preset low-band threshold value and determines that a frequency is a low-band frequency candidate if the low-band cosine value is within a range of the low-band threshold value, and a low-band power comparing section that compares a low-band estimated value into which the determined low-band cosine value has been substituted with a low-band signal power, and the low group tone determining unit 305 determines that an input signal is a low-band tone signal candidate when a comparison result provided by the low-band power comparing section indicates that the low-band estimated value is below the low-band signal power and the low-band frequency candidate determining section determines that the frequency is a low-band frequency candidate.

Likewise, the high group tone determining unit 306 has a high-band output power calculating section that determines a high-band estimating expression representing an output power of a second order FIR band elimination filter when a high-band signal is used as an input and a frequency thereof is used as a parameter, a high-band minimum cosine value calculating section that determines a high-band cosine value of a high-band frequency at which a minimum value of the high-band estimating expression can be obtained, a high-band frequency candidate determining section that compares a high-band cosine value with a preset high-band threshold value and determines that a frequency is a high-band frequency candidate if the high-band cosine value is within a range of the high-band threshold value, and a high-band power comparing section that compares a high-band estimated value into which the determined high-band cosine value has been substituted with a high-band signal power, and the high group tone determining unit 306 determines that an input signal is a high-band tone signal candidate when a comparison result provided by the high-band power comparing section indicates that the high-band estimated value is below the high-band signal power and the high-band frequency candidate determining section determines that the frequency is a high-band frequency candidate.

The DTMF signal time determining unit 307 is adapted to detect an input signal as a DTMF signal if a state, wherein the low group tone determining section 305 determines that the input signal is a low-band tone signal candidate and the high group tone determining section 306 determines that the input signal is a high-band tone signal candidate, is repeated for a preset number of times or more.

The operation of the third embodiment will now be described in detail, mainly focusing on different aspects from those of the foregoing embodiments.

The low pass filter 301 calculates a signal sL(n) obtained by removing high group frequency components from an input signal s(n) received as a vector for every N samples.

The high pass filter 302 calculates a signal sH(n) obtained by removing low group frequency components from an input signal s(n) received as a vector for every N samples.

The low group correlative value calculating circuit 303 calculates a correlative value RL[i][j] as shown below:

$$RL[i][j] = \sum_{n=2}^{N-1} sL(n-i)sL(n-j) \text{ where } i = 0 \sim 2, j = 0 \sim 2$$

The high group correlative value calculating circuit 304 calculates a correlative value RH[i][j] as shown below:

$$RH[i][j] = \sum_{n=2}^{N-1} sH(n-i)sH(n-j) \text{ where } i = 0 \sim 2, j = 0 \sim 2$$

The low group tone determining unit 305 calculates α in the same manner as that of the tone determining unit 102 of the first embodiment except that RL[i][j] is employed in place of R[i][j]. The low group frequency of a DTMF signal is bound to be one of 697 Hz (L1), 770 Hz (L2), 852 Hz (L3), and 941 Hz (L4); hence, threshold values as shown below are prepared in advance, allowing some deviations:

$$\alpha_2 = 2 \cos 2\pi(f_1 - \Delta)$$

where $f_1$ ranges from L1 to L4

$$\alpha_3 = 2 \cos 2\pi(f_1 + \Delta)$$

where $\Delta$ is, for example, 10.

If a determined value of $\alpha$ lies within a range of the threshold values of L1 to L4 above and if the filter output power at that time satisfies $$\sum_{i=2}^{N-1} s(n)^2 > \sum_{i=2}^{N-1} e(n)^2 \times D_L, \quad (15)$$

then FLG_L=1 to 4 is output, wherein 1 to 4 respectively correspond to L1 to L4. If the above condition is not satisfied, then FLG_L=0 is output. $D_L$ is a preset value (e.g. 64).

The high group tone determining unit 306 calculates α in the same manner as that of the tone determining unit 102 of the first embodiment except that RH[i][j] is employed in place of R[i][j]. The high group frequency of a DTMF signal is bound to be one of 1209 Hz (H1), 1336 Hz (H2), 1477 Hz (H3), and 1633 Hz (H4); hence, threshold values as shown below are prepared in advance, allowing some deviations:

$$\alpha_2 = 2 \cos 2\pi(f_1 - \Delta)$$

$$\alpha_3 = 2 \cos 2\pi(f_1 + \Delta)$$

where $f_1$ ranges from H1 to H4
where $\Delta$ is, for example, 10. If a determined value of a lies within a range of the threshold values of H1 to H4 above and if the filter output power at that time satisfies $$\sum_{i=2}^{N-1} s(n)^2 > \sum_{i=2}^{N-1} e(n)^2 \times D_H, \quad (16)$$

then FLG_H=1 to 4 is output, wherein 1 to 4 respectively correspond to H1 to H4. If the above condition is not satisfied, then FLG_H=0 is output. $D_H$ is a preset value (e.g. 64).

The DTMF tone time determining unit 307 checks FLG_L and FLG_H obtained for every N samples of input signal, and if neither of them is 0, then it sets the combination as a DTMF signal candidate, and if this state continues for a predetermined time or longer, then it detects an input signal as a DTMF signal. More specifically, if FLG_L!=0 and FLG_H!=0 is repeated for an $M_3$ number of times or more in succession, then

VAL=(FLG_L−1)×4+(FLG_H−1)

is output. After the DTMF signal has been detected once, if

FLG_L=0 or FLG_H=0 is repeated for an $M_4$ number of times or more in succession, then VAL=−1 (no detection) is output. $M_3$ and $M_4$ are preset values (e.g. $M_3$=5, $M_4$=5).

The low pass filter 301 in the third embodiment is configured to obtain low-band signals by removing high group frequencies. A band pass filter may be used instead of the low pass filter to fulfill the purpose. Likewise, the high pass filter 302 is configured to obtain high-band signals by removing low group frequencies. A band pass filter may be used instead of the high pass filter to fulfill the purpose.

The third embodiment described above permits accurate detection of DTMF signals and requires a smaller volume of operation by using a simple configuration.

The present invention utilizes the FIR band elimination filter, making it possible to accurately determine the presence of tonality or a frequency at which an input signal is a tone signal by carrying out simple calculations based on a correlative value of the input signal.

What is claimed is:

1. A method for detecting a tone signal, comprising the steps of:

determining a correlative value of an input signal obtained for each frame of a predetermined length;

determining an estimating expression that represents an output power of a second order FIR band elimination filter that uses said correlative value of the input signal as an input and a frequency thereof as a parameter;

determining a frequency at which a minimum value of said estimating expression is obtained;

determining a prediction gain of said FIR band elimination filter at said determined frequency; and determining that the input signal is a tone signal if a value of said determined prediction gain exceeds a preset threshold value.

2. A method for detecting a tone signal according to claim 1, wherein a frequency when a tone signal has been recognized is output.

3. method for detecting a tone signal according to claim 1, wherein said FIR band elimination filter is a second order FIR band elimination filter, and said estimating expression is as follows:

$$\sum_{n=2}^{N-1} e(n)^2 = $$

$$(R[0][0] + R[2][2] + 2R[0][2]) - 2(R[0][1] + R[1][2])\alpha + R[1][1]\alpha^2.$$

4. A tone signal detector comprising:

a correlative value calculating circuit for determining a correlative value of an input signal obtained for every frame of a predetermined length; and a tone determining unit that has an output power calculating section that determines an estimating expression representing an output power of a second order FIR band elimination filter that uses said correlative value of the input signal as an input and a frequency thereof as a parameter, a minimum frequency calculating section that determines a frequency at which a minimum value of said estimating expression can be obtained, a prediction gain calculating section that determines a prediction gain of said FIR band elimination filter at the frequency determined by said minimum frequency calculating section, and a prediction gain comparing section that compares a value of said prediction gain determined by said prediction gain calculating section with a preset threshold value, and said tone determining unit determines that the input signal is a tone signal if said prediction gain exceeds said threshold value.

5. A tone signal detector according to claim 4, wherein said tone determining unit outputs a frequency at which a tone signal has been recognized.

6. A tone signal detector according to claim 4, wherein said FIR band elimination filter is a second order FIR band elimination filter, and said estimating expression is as follows:

$$\sum_{n=2}^{N-1} e(n)^2 = (R[0][0] + R[2][2] + 2R[0][2]) - 2(R[0][1] + R[1][2])\alpha + R[1][1]\alpha^2.$$

7. A method for detecting a tone signal comprising the steps of:
   determining a correlative value of an input signal obtained for each frame of a predetermined length;
   determining an estimating expression that represents an output power of a second order FIR band elimination filter that uses said correlative value of the input signal as an input and a frequency thereof as a parameter;
   determining a cosine value of a frequency at which a minimum value of said estimating expression is obtained;
   comparing said cosine value with a preset threshold value to decide that the frequency is a frequency candidate if said cosine value is within a range of said threshold value;
   determining an input signal power;
   multiplying an estimated value into which said determined cosine value has been substituted by a preset constant;
   comparing said estimated value multiplied by said constant with said input signal power;
   determining that the input signal is a tone signal candidate if said estimated value multiplied by said constant is below said input signal power and if the frequency thereof has been determined to be said frequency candidate; and
   detecting the input signal as a tone signal if said tone signal candidate determination is repeated for a preset number of times or more.

8. A tone signal detector comprising:
   a correlative value calculating circuit for determining a correlative value of an input signal obtained for every frame of a predetermined length; and
   a tone determining unit that has an output power calculating section that determines an estimating expression representing an output power of a second order FIR band elimination filter that uses said correlative value of the input signal as an input and a frequency thereof as a parameter, a minimum cosine value calculating section that determines a cosine value of a frequency at which a minimum value of said estimating expression can be obtained, a frequency candidate determining section that compares said cosine value with a preset threshold value and determines that the frequency is a frequency candidate if said cosine value lies within a range of said threshold value, and a power comparing section that compares an estimated value into which said determined cosine value has been substituted with an input signal power, and determines that the input signal is a tone signal candidate if a comparison result of said power comparing section indicates that said estimated value is below said input signal power and if said frequency candidate determining section determines that the frequency is a frequency candidate;
   a tone time determining unit detects the input signal as a tone signal if the determination of a tone signal candidate by said tone determining unit is repeated for a preset number of times or more.

9. A method for detecting a tone signal comprising the steps of:
   obtaining a low-band signal by removing a high group frequency from an input signal obtained for each frame of a predetermined length;
   determining a low-band signal correlative value of said low-band signal;
   determining a low-band estimating expression representing an output power of a second order FIR band elimination filter when said low-band signal is used as an input and a frequency thereof is used as a parameter;
   determining a low-band cosine value of a low-band frequency at which a minimum value of said low-band estimating expression is obtained;
   comparing said low-band cosine value with a preset low-band threshold value;
   deciding that the frequency is a low-band frequency candidate if said low-band cosine value lies within a range of said low-band threshold value;
   determining a low-band signal power of said low-band signal;
   multiplying a low-band estimated value into which said determined low-band cosine value has been substituted by a preset low-band constant;
   comparing said low-band estimated value multiplied by said low-band constant with said low-band signal power;
   deciding that the input signal is a low-band tone signal candidate if said low-band estimated value multiplied by said low-band constant is below said low-band signal power and if the input signal has been determined to be said low-band frequency candidate;
   obtaining a high-band signal by removing a low group frequency from an input signal obtained for each frame of said predetermined length;
   determining a high-band signal correlative value of said high-band signal;
   determining a high-band estimating expression representing an output power of a second order FIR band elimination filter when said high-band signal is used as an input and a frequency thereof is used as a parameter;
   determining a high-band cosine value of a high-band frequency at which a minimum value of said high-band estimating expression is obtained;
   comparing said high-band cosine value with a preset high-band threshold value;
   deciding that the frequency is a high-band frequency candidate if said high-band cosine value lies within a range of said high-band threshold value;
   determining a high-band signal power of said high-band signal;
   multiplying a high-band estimated value into which said determined high-band cosine value has been substituted by a preset high-band constant;
   comparing said high-band estimated value multiplied by said high-band constant with said high-band signal power;
   deciding that the input signal is a high-band tone signal candidate if said high-band estimated value multiplied by said high-band constant is below said high-band signal power and if the input signal has been determined to be said high-band frequency candidate; and detecting the input signal as a DTMF signal if a state, wherein the input signal has been determined to be said low-band tone signal candidate and said high-band tone signal candidate, is repeated for a preset number of times or more in succession.

10. A tone signal detector comprising:

a filter for obtaining a low-band signal by removing a high group frequency from an input signal obtained for every frame of a predetermined length;

a low group correlative value calculating circuit for determining a low-band signal correlative value of said low-band signal;

a low group tone determining unit that has a low-band output power calculating section that determines a low-band estimating expression representing an output power of a second order FIR band elimination filter that uses said low-band signal as an input and a frequency thereof as a parameter, a low-band minimum cosine value calculating section that determines a low-band cosine value of a low-band frequency at which a minimum value of said low-band estimating expression can be obtained, a low-band frequency candidate determining section that compares said low-band cosine value with a preset low-band threshold value and determines that the frequency is a low-band frequency candidate if said low-band cosine value lies within a range of said low-band threshold value, and a low-band power comparing section that compares a low-band estimated value into which said determined low-band cosine value has been substituted with a low-band signal power, and determines that the input signal is a low-band tone signal candidate if a comparison result of said low-band power comparing section indicates that said low-band estimated value is below said low-band signal power and if said low-band frequency candidate determining section determines that the frequency is a low-band frequency candidate;

a filter for obtaining a high-band signal by removing a low group frequency from an input signal obtained for every frame of said predetermined length;

a high group correlative value calculating circuit for determining a high-band signal correlative value of said high-band signal;

a high group tone determining unit that has a high-band output power calculating section that determines a high-band estimating expression representing an output power of a second order FIR band elimination filter that uses said high-band signal as an input and a frequency thereof as a parameter, a high-band minimum cosine value calculating section that determines a high-band cosine value of a high-band frequency at which a minimum value of said high-band estimating expression can be obtained, a high-band frequency candidate determining section that compares said high-band cosine value with a preset high-band threshold value and determines that the frequency is a high-band frequency candidate if said high-band cosine value lies within a range of said high-band threshold value, and a high-band power comparing section that compares a high-band estimated value into which said determined high-band cosine value has been substituted with a high-band signal power, and determines that the input signal is a high-band tone signal candidate if a comparison result of said high-band power comparing section indicates that said high-band estimated value is below said high-band signal power and if said high-band frequency candidate determining section determines that the frequency is a high-band frequency candidate; and a time determining unit that detects the input signal as a DTMF signal if a state, wherein the input signal is determined to be a low-band tone signal candidate by said low group tone determining unit and determined to be a high-band tone signal candidate by said high group tone determining unit, is repeated for a preset number of times or more in succession.

* * * * *